United States Patent [19]

Hosoya

[11] Patent Number: 4,776,682

[45] Date of Patent: Oct. 11, 1988

[54] PROJECTION LENS SYSTEM WITH VARIABLE AIR SPACE

[75] Inventor: Jun Hosoya, Tokyo, Japan

[73] Assignee: Canon Kabushiki Kaisha, Tokyo, Japan

[21] Appl. No.: 918,936

[22] Filed: Oct. 15, 1986

[30] Foreign Application Priority Data

Oct. 21, 1985 [JP] Japan .................. 60-235925

[51] Int. Cl.[4] .................. G02B 9/62; G02B 3/00; G02B 7/02
[52] U.S. Cl. .................. 350/464; 350/412; 350/255
[58] Field of Search .................. 350/255, 431, 432, 464, 350/465, 412

[56] References Cited

U.S. PATENT DOCUMENTS

| | | | |
|---|---|---|---|
| 3,868,173 | 2/1975 | Miles et al. | 350/255 |
| 3,926,504 | 12/1975 | Fleischman | 350/255 |
| 4,076,390 | 2/1978 | Fleischman | 350/465 |
| 4,124,276 | 11/1978 | Okano et al. | 350/431 |

FOREIGN PATENT DOCUMENTS 1321965 7/1973 United Kingdom .............. 350/464

Primary Examiner—John K. Corbin
Assistant Examiner—Ronald M. Kachmarik
Attorney, Agent, or Firm—Fitzpatrick, Cella, Harper & Scinto

[57] ABSTRACT

A projection lens system comprises a first group of lenses having at least one variable spacing for correcting aberration, and a second group of lenses having a variable spacing for focusing with the lens located closest to an image being fixed. It corrects variation of aberration and allows variable projection magnification.

5 Claims, 15 Drawing Sheets

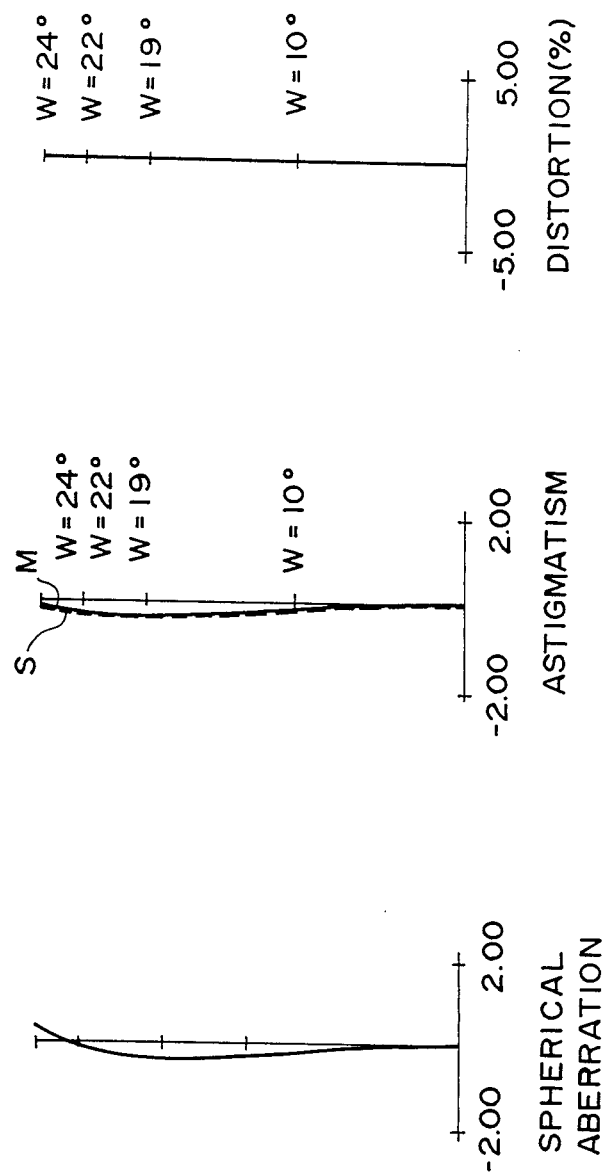

TRANSVERSE ABERRATIONS

TRANSVERSE ABERRATIONS

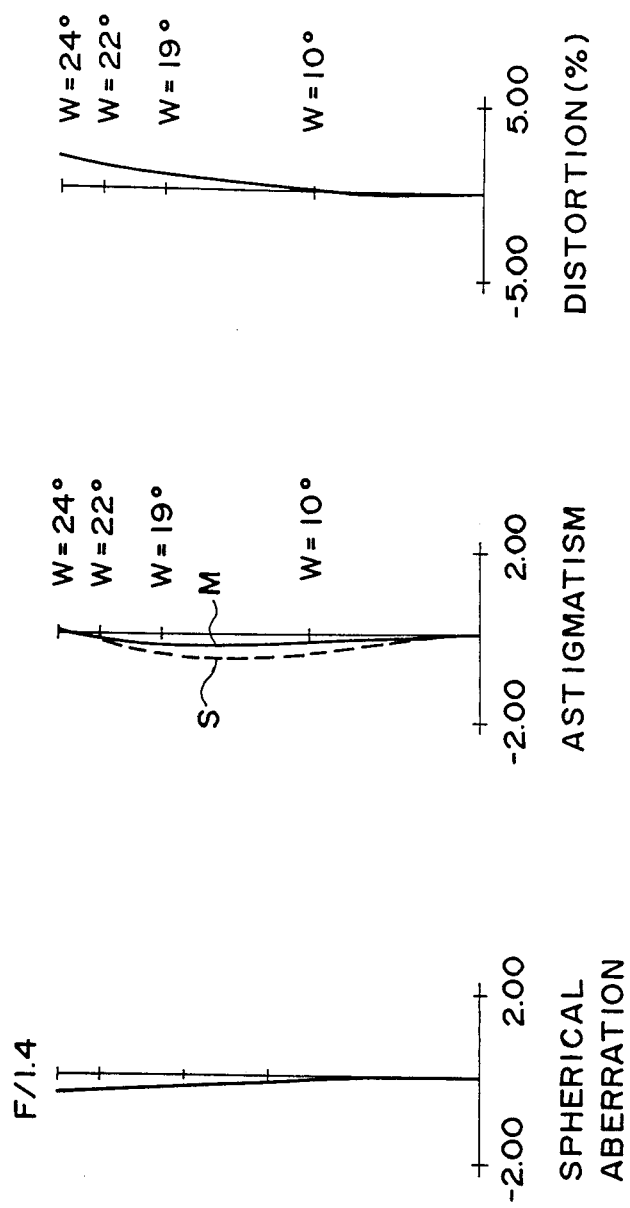
FIG. 4B-I

TRANSVERSE ABERRATIONS

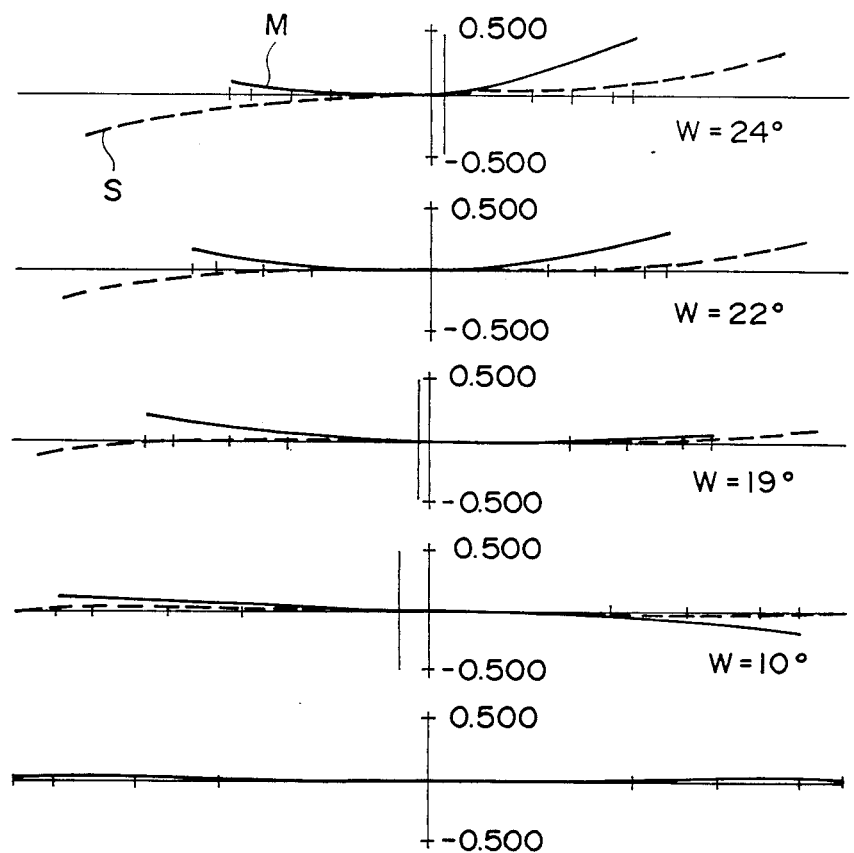
TRANSVERSE ABERRATIONS
F I G. 4C-2

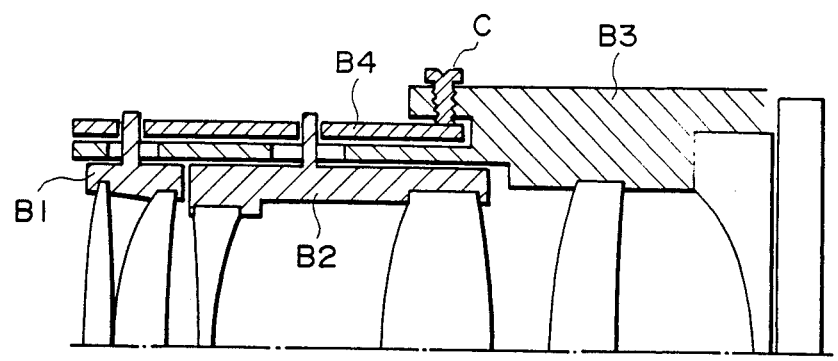
F I G. 5
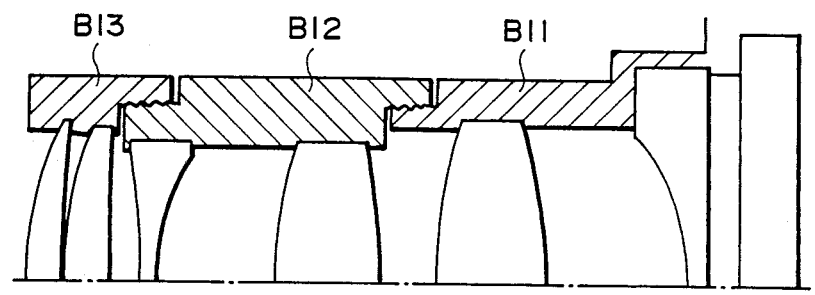
F I G. 6

PROJECTION LENS SYSTEM WITH VARIABLE AIR SPACE

BACKGROUND OF THE INVENTION

1. Field of the Invention

The present invention relates to a projection lens system, and more particularly to a magnifying projection lens system for magnifying and projecting an image displayed on an electronic display tube onto a screen, and to a projection lens system suitable for magnified projection of a high precision image of a variable projection magnification, having a mechanism for correcting a variation of aberration created by focusing.

2. Related Background Art

In the past, the projection lens systems have been constructed with glass lenses, or plastic lenses having non-spherical surfaces in order to reduce size and weight. Those projection lens systems have applications in display apparatus for home use, audio-visual educational use, TV conference system or high precision image system. Recently, applications in high quality image display such as high precision image system have been rapidly increasing, and the prior art projection lens systems for those applications have several problems in their optical characteristics. Among others, a resolution, particularly a resolution in a periphery of an image is significantly insufficient.

As the projection lens system, it is required that the lens system is portable and can project an image from any point onto a screen, or can be mounted in an image receiver of varying projection distance. In most of the prior art projection lens systems, focusing is attained by varying one of the spaces between lenses of a lens system.

Those system may be used only when a variation of distance between the system and a screen on which an image should be projected is small but a performance of the system is significantly lowered for a variation of the distance over a large range. Accordingly, those lens systems are hardly put into practice. A related application has been filed as USSN 747,029 but it does not describe reduction of performance due to focusing.

SUMMARY OF THE INVENTION

It is an object of the present invention to properly correct aberration created by focusing in a projection lens system.

In order to achieve the above object, the projection lens system for magnifying and projecting an original image onto a screen comprises a first group of lenses having at least one floating spacing for correcting aberration, and a second group of lenses having a lens closest to the original image fixed and at least one variable spacing for focusing, and corrects a variation of aberration by focusing, particularly image plane curvature spherical aberration or coma aberration.

BRIEF DESCRIPTION OF THE DRAWINGS

FIG. 3A-1 and 3A-2 show aberrations at a design projection magnification of 1/22 in Embodiment 1, FIG. 3B-1 and 3B-2 show aberrations at a near distant point or projection magnification of 1/17, FIG. 3C-1 and 3C-2 show aberrations at a far distance point or projection magnification of 1/40, FIG. 4A-1 and 4A-2 show aberrations at design projection magnification of 1/22 in Embodiment 2, FIG. 4B-1 and 4B-2 show aberrations at a near distance point or projection magnification of 1/17, FIG. 4C-1 and 4C-2 show aberrations at a far distance point or projections magnification of 1/40, and FIGS. 5 and 6 show sectional views of bodytubes.

DESCRIPTION OF THE PREFERRED EMBODIMENTS

Figure 1:
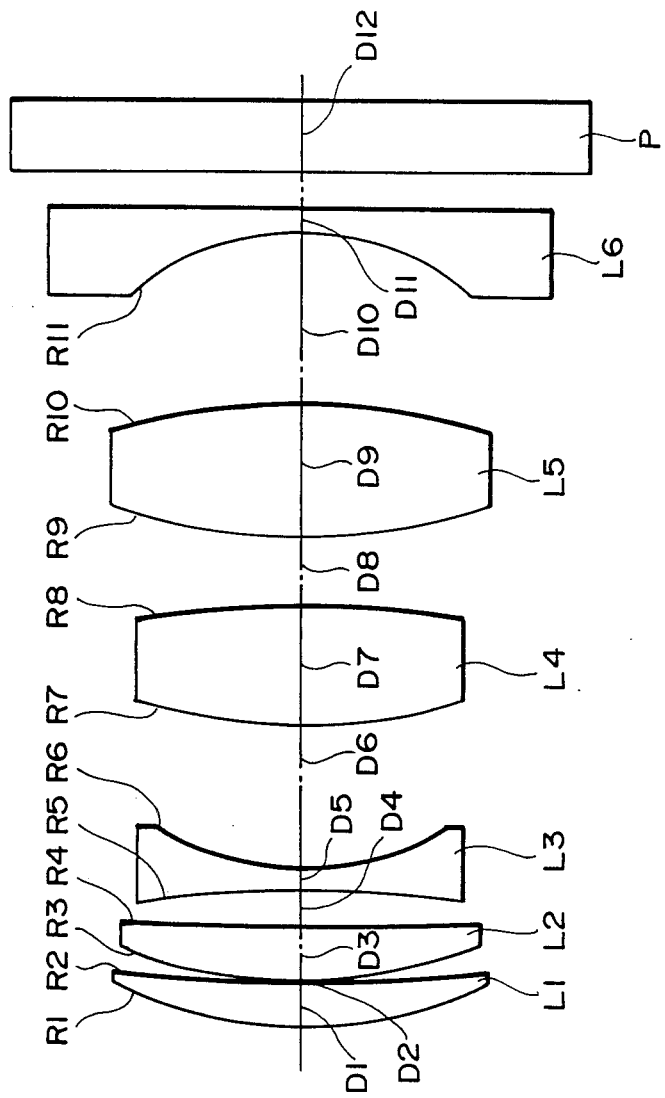
FIG. 1 shows a sectional view of a lens system of Embodiment 1 of the present invention.
Figure 2:
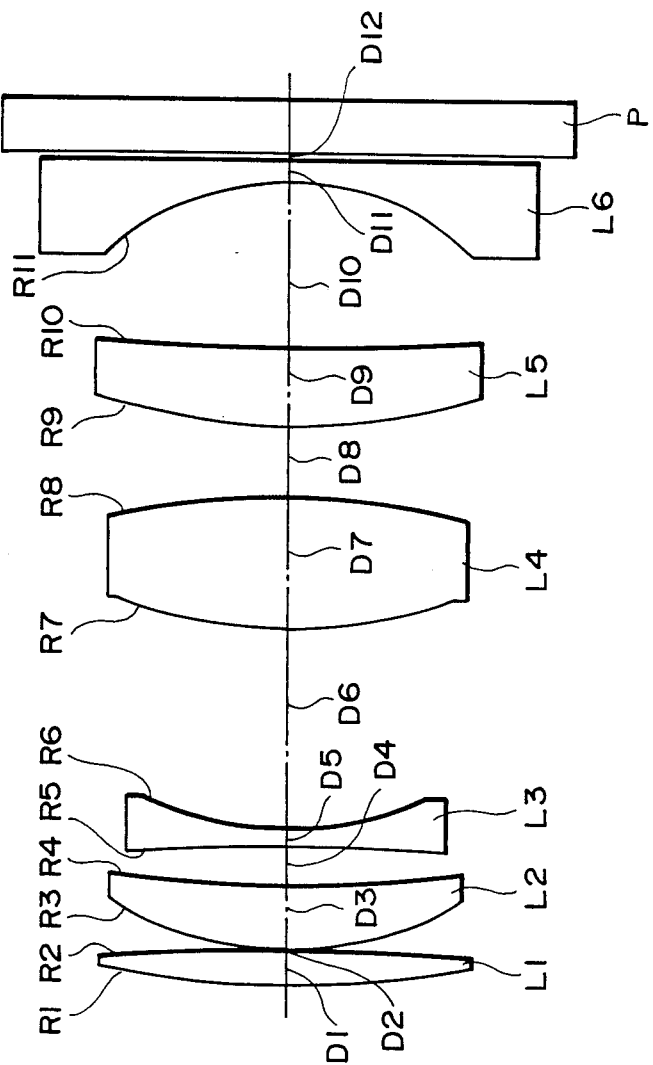
FIG. 2 shows a sectional view of a lens system of Embodiment 2.
Figures 1, 3A:
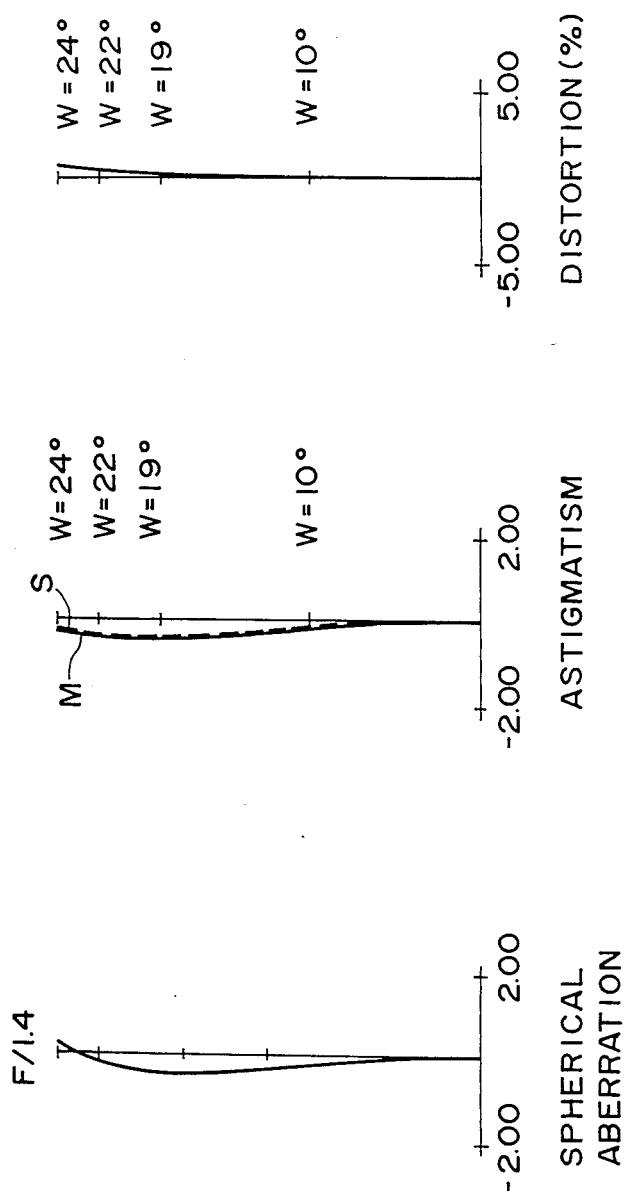
Figures 2, 3A:
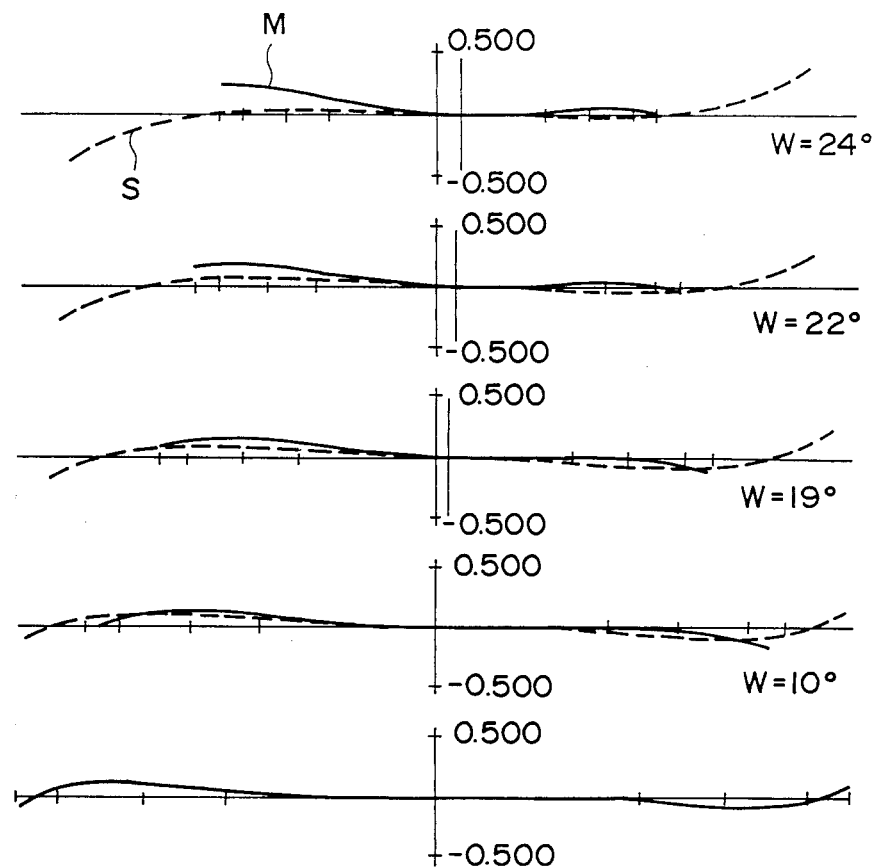
Figures 1, 3B:
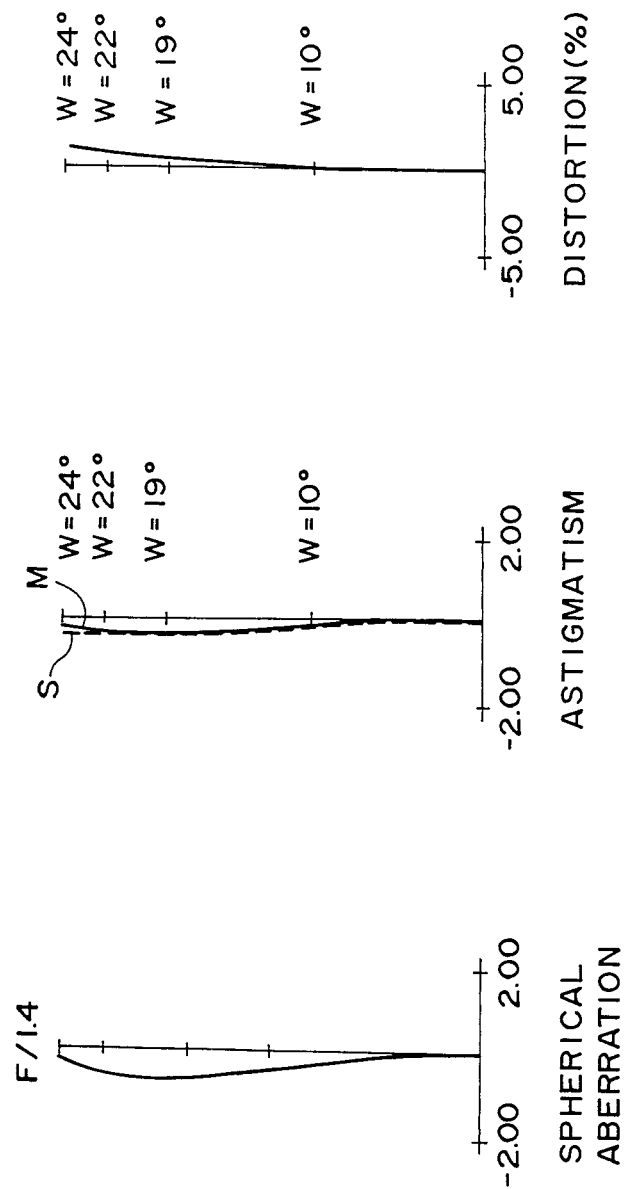
Figures 2, 3B:
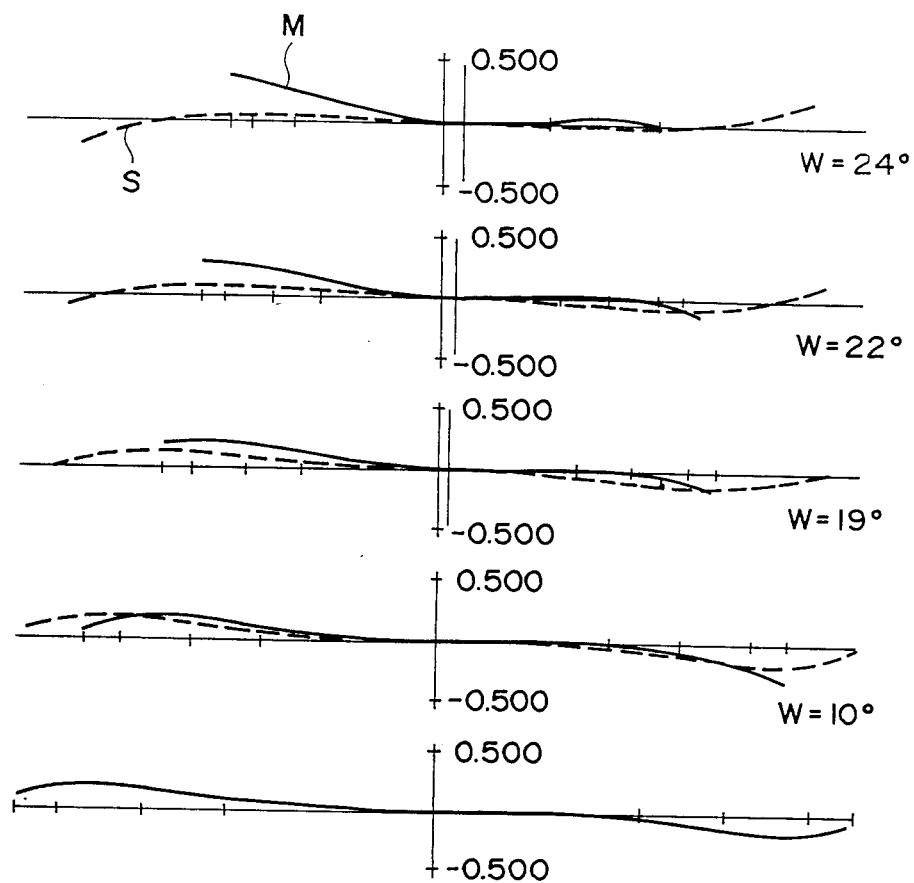
Figures 2, 3C:
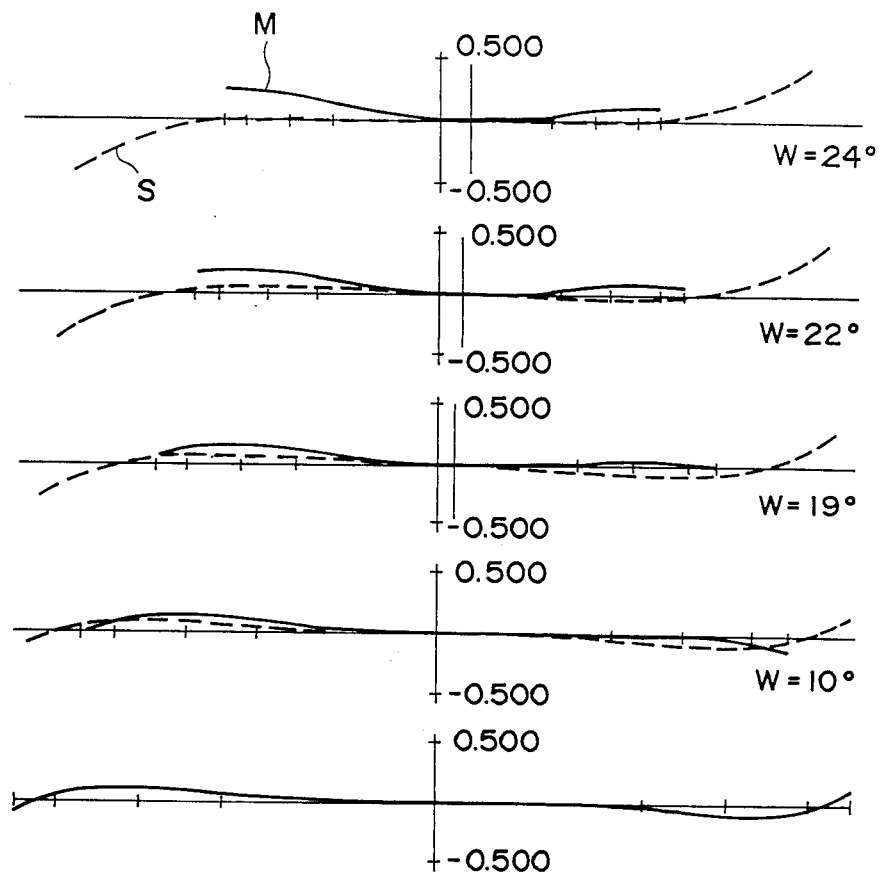
Figures 1, 4A:
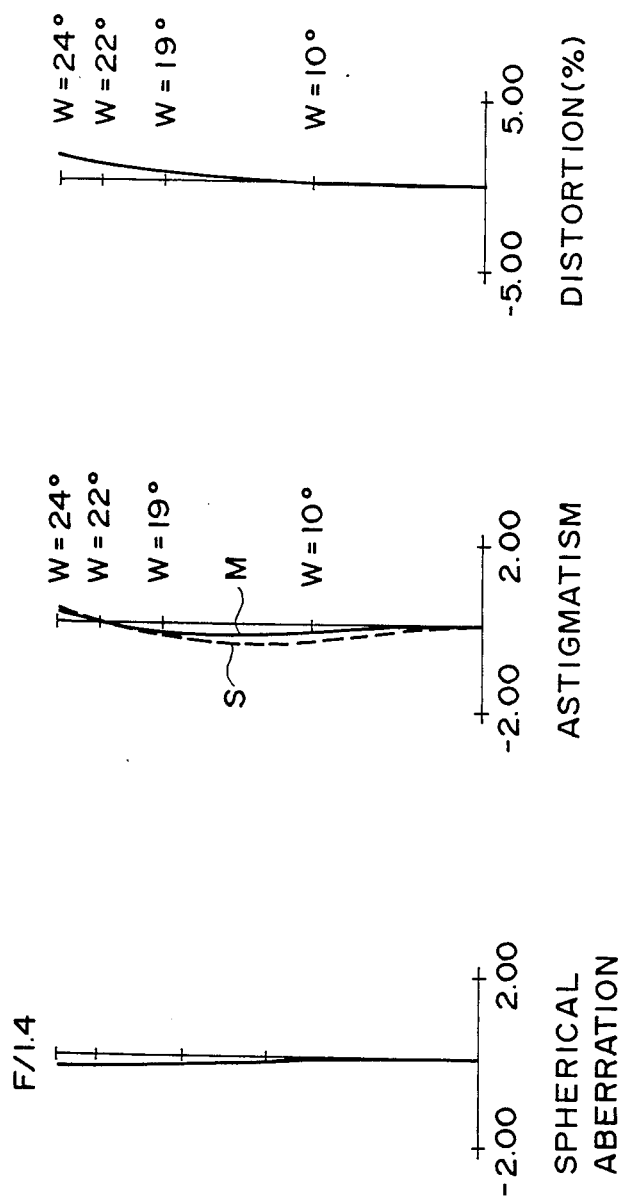
Figures 2, 4A:
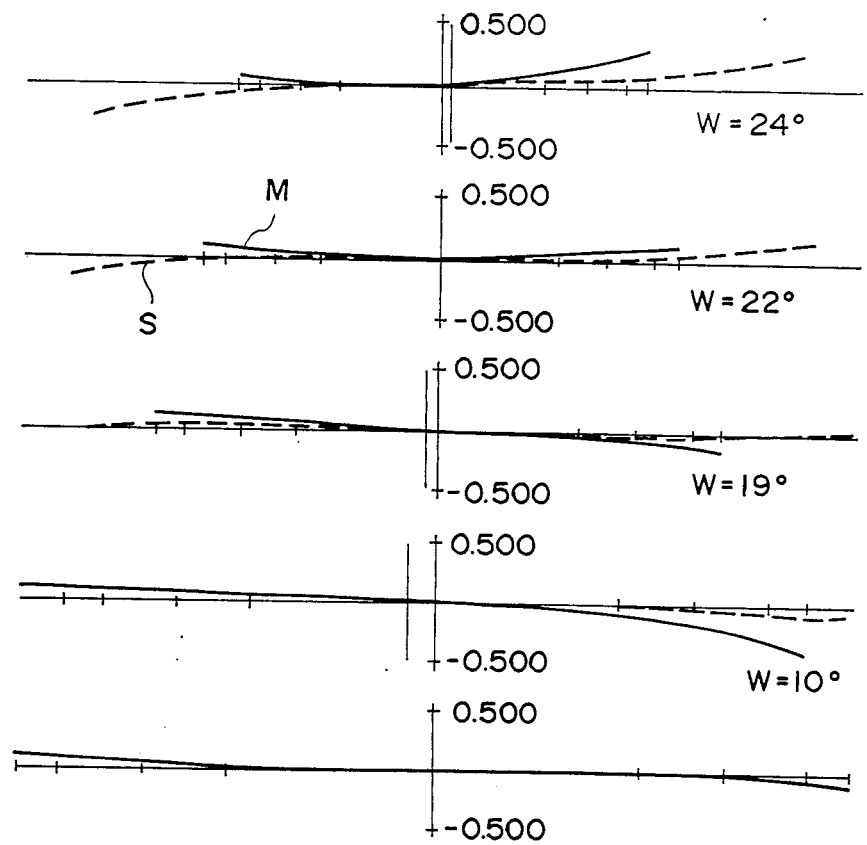
Figures 2, 4B:
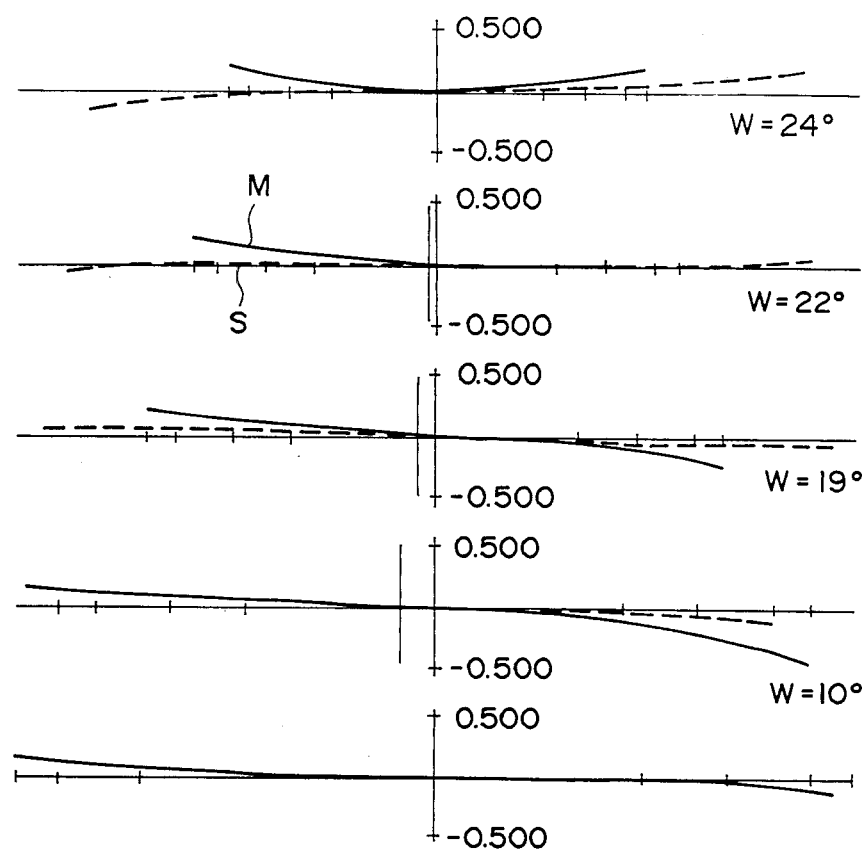
Figures 1, 4C:
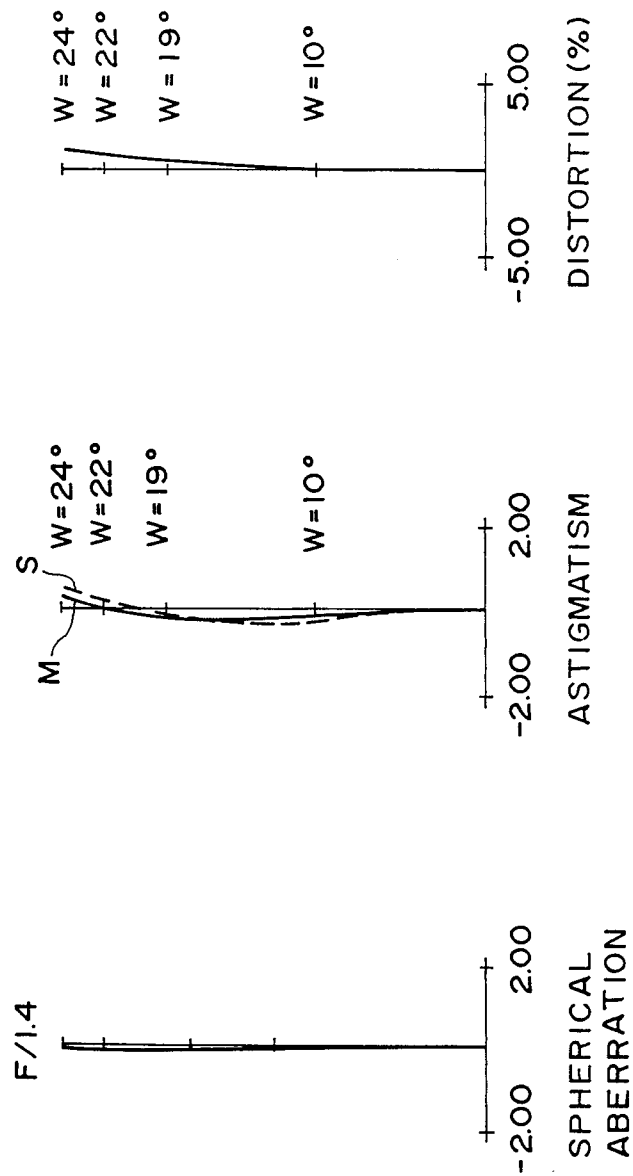

FIGS. 1 and 2 show optical sectional views of a projection lens system. A screen is arranged at a far point on the left hand. P denotes a faceplate of a cathode ray tube. A video image is displayed on a phosphor screen.

A first lens L1 and a second lens L2 closer to the screen have positive refraction power and constitute a front group of a first group of lenses which has a positive refraction power as a whole and primarily corrects aberration due to a diameter. The front group of the first group of lenses may comprise one to three or more lenses. A third lens L3 has a negative refraction power, corrects spherical aberration or coma aberration created by the front group of the first group of lenses and constitutes a rear group of the first group of lenses which has a negative refraction power as a whole. The rear group of the first group of lenses may comprise one to three or more lenses. A spacing D4 between the front group and the rear group of the first group of lenses corrects variation of aberration, particularly spherical aberration or coma aberration created by focusing.

A fourth lens L4 and a fifth lens L5 have positive refraction power for focusing and bear major portions of the positive refraction power of the projection lens system. At least one of them is preferably a double convex lens. A front group of a second group of lenses comprises the fourth lens L4 and the fifth lens L5, and has a positive refraction power as a whole. The front group of the second group of lenses may comprise two or more lenses.

A sixth lens L6 has a function of field flattener and has a negative refraction power by a concave plane facing the screen. It functions to correct image plane curvature and distortion aberration and constitutes a rear group of the second group of lenses. One spacing in the second group of lenses is changed and lenses forward of it are moved in union to focus an image. Variation of aberration created thereby, particularly, image plane curvature spherical aberration and coma aberration are corrected by floating the spacing between the front group and the rear group in the first group.

A mechanism for changing the spacing for focusing and floating may be one to change the floating spacing in synchronism with the focusing operation (FIG. 5). Cam pins of movable tubes B1 and B2 engage with a linear guide groove of a fixed bodytube B3 and a cam groove of a cam tube B4, respectively, and they are driven as the cam tube B rotates. C denotes a screw to fix the cam tube B4. Alternatively, a portion forward of the focusing spacing is supported by one bodytube and a portion forward of the floating spacing is held by the movable tube and manually adjusted relative to the bodytube. Alternatively, as shown in FIG. 6, a portion between the sixth lens L6 and the focusing spacing is held by a first bodytube B11, a portion between the focusing spacing and the floating spacing is held by a second bodytube B12, and a portion forward of the floating spacing is held by a third bodytube B13, and the respective bodytubes are extendable from other bodytube to allow adjustment of extended distances.

The object of the present invention is achieved by the above construction. When the above conditions are met, the aberration is more precisely corrected, the performance is improved and the design time is reduced.

When the refraction power of the overall system is $\phi$, the refraction power of the overall first group of lenses is $\phi_{10}$, the refraction power of the front group of the first group of lenses is $\phi_{11}$, the refraction power of the rear group of the first group of lenses is $\phi_{12}$, the refraction power of the overall second group of lenses is $\phi_{20}$, the refraction power of the front group of the second group of lenses is $\phi_{21}$ and the refraction power of the rear group of the second group of lenses is $\phi_{22}$, then the following conditions are met.

(1) $0.72 < |\phi_{11}|/|\phi_{12}| < 0.98$
(2) $1.25 < \phi_{21}/\phi < 1.58$

Significance of the conditions and their limit values is explained below. The condition (1) relates to a ratio of powers of the front group and the rear group of the first group of lenses. When it is below the lower limit, the refraction power of the overall front group is negative, the share of the positive refraction power of the front group of the second group of lenses increases and the correction of the spherical aberrations is hard to attain.

When it exceeds the upper limit, the creation of the spherical aberration by the front group increase and the correction of the aberration in the rear group of the first group of lenses is hard to attain. Further, the creation of off-axis aberration, particularly coma aberration increases and the correction thereof is hard to attain.

The condition (2) relates to the refraction power of the front group of the second group of lenses. When it is below the lower limit, the share of the positive refraction power of the front group of the first group of lenses increases, the spherical aberration increases and the correction is hard to attain. Further, the positive refraction power for the off-axis light is insufficient and the correction of the off-axis aberration, particularly coma aberration is hard to attain.

When it exceeds the upper limit, the creation of the spherical aberration increases and the correction is hard to attain.

A condition for correcting variation of aberration by changing a projection distance for focusing is now described. It is desirable that spherical aberration of a group which is movable in focusing is substantially corrected. In the first group of lenses, since the front group and the rear group correct the spherical aberration in cooperation with each other, the spherical aberration varies if the focusing is done by the first group of lenses. Accordingly, the focusing is done in the second group of lenses. It is desirable that a relation of $0.67 < \phi_F/\phi 1.25$ is met, where $\phi_F$ is a power to a focusing interval and $\phi$ is the overall power. If $\phi_F$ exceeds the upper limit, the power of the focusing movable group is stronger than the power of the entire system and the variation of the spherical aberration is hard to be corrected. If $\phi_F$ is below the lower limit, the power of the focusing movable group is too weak and the distance of movement is too large.

In order to reduce the variation of the coma aberration of the off-axis aberration and the image plane curvature by the focusing, it is effective to fix the negative lens of the rear group of the second group of lens and at least one of the positive lenses in the front group of the second group of lenses in the focusing. The negative lens in the rear group of the second group of lenses which functions as a flattener has a large power and corrects the off-axis aberration, primarily the image plane curvature created in the overall system. Thus, if the focusing is done by fixing only the flattener, the off-axis aberration varies because under correction spacing for the off-axis aberration is moved. It is therefore desirable to fix at least one positive lens in the front group of the second group in the focusing to balance with the flattener.

The variation of the aberration can be further corrected by slightly changing the spacing in the first group of lenses in accordance with the focusing for floating. Thus, the projection performance is improved and the variable range of magnification can be expanded. In order to suppress the variation of aberration by the focusing, particularly the variation of the remaining spherical aberration, it is effective to render the spacing between the front group and the rear group of the first group of lenses variable as floating spacing. Since the positive lens of the front group of the first group of lenses and the negative lens of the rear group cancels the spherical aberration, the spherical aberration can be readily changed by slightly changing the spacing.

Lens data in examples are shown below, in which $R_1$, $R_2$, ... denote radii of curvature of lens planes, $D_1$, $D_2$, ... denote thicknesses or air gaps between the lens planes, $N_1$, $N_2$, ... denote refraction coefficients of the lenses to an e-ray (having wavelength of 546.1 nm), and $V_1$, $V_2$, ... denote Abbe numbers for the e-ray. The data in the examples were measured for a focal distance of 100. P denotes a faceplate of a display tube.

[NUMERIC EXAMPLE 1]

| F = 100. | FNO = 1:1.4 | 2W = 48 | |
|---|---|---|---|
| $R_1 = 76.04$ | $D_1 = 7.84$ | $N_1 = 1.66152$ | $V_1 = 50.9$ |
| $R_2 = 278.87$ | $D_2 = 0.32$ | | |
| $R_3 = 89.44$ | $D_3 = 9.71$ | $N_2 = 1.60548$ | $V_2 = 60.7$ |
| $R_4 = 1026.64$ | $D_4 = 6.61$ | (variable) | |
| $R_5 = -202.69$ | $D_5 = 3.45$ | $N_3 = 1.69417$ | $V_3 = 31.1$ |
| $R_6 = 51.35$ | $D_6 = 25.75$ | | |
| $R_7 = 92.65$ | $D_7 = 22.77$ | $N_4 = 1.60548$ | $V_4 = 60.7$ |
| $R_8 = -177.09$ | $D_8 = 12.19$ | (variable) | |
| $R_9 = 119.31$ | $D_9 = 23.64$ | $N_5 = 1.51825$ | $V_5 = 64.1$ |
| $R_{10} = -112.02$ | $D_{10} = 30.66$ | | |
| $R_{11} = -47.37$ | $D_{11} = 4.19$ | $N_6 = 1.73429$ | $V_6 = 28.5$ |
| $R_{12} = 0.0$ | $D_{12} = 6.62$ | | |
| $R_{13} = 0.0$ | $D_{13} = 12.70$ | $N_7 = 1.54212$ | $V_7 = 59.5$ |
| $R_{14} = 0.0$ | | | |

| Variation of Air Gap | | |
|---|---|---|
| Magnification | $D_4$ | $D_8$ |
| 1/12 | 7.44 | 12.48 |
| 1/22 | 6.61 | 12.19 |
| 1/40 | 6.03 | 10.68 |

[NUMERIC EXAMPLE 2]

| F = 100. | FNO = 1:1.4 | 2W = 48° | |
|---|---|---|---|
| $R_1 = 190.69$ | $D_1 = 6.08$ | $N_1 = 1.66152$ | $V_1 = 50.9$ |
| $R_2 = -491.75$ | $D_2 = 0.33$ | | |
| $R_3 = 64.97$ | $D_3 = 11.50$ | $N_2 = 1.60548$ | $V_2 = 60.7$ |
| $R_4 = 244.23$ | $D_4 = 6.98$ | (variable) | |
| $R_5 = -432.99$ | $D_5 = 3.49$ | $N_3 = 1.69417$ | $V_3 = 31.1$ |
| $R_6 = 66.21$ | $D_6 = 37.15$ | | |
| $R_7 = 88.81$ | $D_7 = 23.80$ | $N_4 = 1.60548$ | $V_4 = 60.7$ |

-continued

| | | | |
|---|---|---|---|
| $R_8 = -175.80$ | $D_8 = 12.73$ | (variable) | |
| $R_9 = 122.60$ | $D_9 = 14.28$ | $N_5 = 1.51825$ | $V_5 = 64.1$ |
| $R_{10} = 528.70$ | $D_{10} = 29.82$ | | |
| $R_{11} = -51.01$ | $D_{11} = 4.24$ | $N_6 = 1.73429$ | $V_6 = 28.5$ |
| $R_{12} = 0.0$ | $D_{12} = 0.72$ | | |
| $R_{13} = 0.0$ | $D_{13} = 10.00$ | $N_7 = 1.54212$ | $V_7 = 59.5$ |
| $R_{14} = 0.0$ | | | |

| Variation of Air Gap | | |
|---|---|---|
| Magnification | $D_4$ | $D_8$ |
| 1/17 | 7.50 | 12.96 |
| 1/22 | 6.98 | 12.73 |
| 1/40 | 6.57 | 10.94 |

In accordance with the present invention, the variation of the spherical aberration or the variation of the image plane curvature by the focusing as well as the variation of the coma aberration can be corrected over the entire screen by adopting the system in which the focusing spacing in the second group of lenses is changed and the floating spacing in the first group of lenses is appropriately changed. Thus, a high quality projected image can be provided.

I claim:

1. A projection lens system for projecting an image on a screen comprising:
   a first group of lenses and a second group of lenses arranged in this sequency away from the screen,
   said first group of lenses including a plurality of lenses having at least one variable spacing for correcting aberration,
   said second group of lenses including a plurality of lenses having at least one variable spacing for focusing, with the lens located closest to the image being fixed, and satisfying a condition:

$0.67 < \phi_F/\phi 1.25$ where $\phi_F$ is a combined refraction power of the lenses between the focusing spacing and the screen, and $\phi$ is the refraction power of the overall system.

2. A projection lens system according to claim 1 wherein said first lens group includes a front lens unit having at least one positive refraction power lens and a rear lens unit having at least one negative refraction power, and said second lens group includes a front lens unit having at least two positive refraction power lenses and a rear lens unit having a negative refraction power lens having a concave plane of a large radius of curvature facing the screen.

3. A projection lens system according to claim 1 wherein $0.72 < |\phi_{11}|/|\phi_{12}| < 0.98$ $1.25 < \phi_{21}/\phi < 1.58$ where $\phi_{11}$ is a refraction power of the front lens unit of the first lens group, $\phi_{12}$ is the refraction power of the rear lens unit of the first lens group, $\phi_{21}$ is the refraction power of the front lens unit of the second lens group, and $\phi$ is the refraction power of the overall system.

4. A projection lens system for projecting an image on a screen comprising:
   a first lens group and a second lens group arranged in this sequency away from the screen,
   said second lens group including a first lens unit having a plurality of positive lenses and a rear lens unit having a lens which has negative refractive power and has a concavity surface to screen side, and effecting a focusing operation by varying the spacing between the lenses in said front lens unit,
   said first lens group including a front lens unit having a plurality of positive lenses and a rear lens unit having a double-concave lens, and restricting the aberration generated by the focusing operation by varying the distance between said front lens unit and said rear lens unit, and satisfying a condition:

$0.72 < |\phi_{11}|/|\phi_{12}| < 0.98$ $1.25 < \phi_{21}/\phi < 1.58$ where $\phi_{11}$ is a refraction power of the front lens unit of the first lens group, $\phi_{12}$ is the refraction power of the rear lens unit of the first lens group, $\phi_{21}$ is the refraction power of the front lens unit of the second lens group, and $\phi$ is the refraction power of the overall system.

5. A projection lens system according to claim 4, wherein $0.67 < \phi_F/\phi < 1.25$ where $\phi_F$ is a combined refraction power of the lenses between the focusing spacing and the screen, and $\phi$ is the refraction power of the overall system.

* * * * *

UNITED STATES PATENT AND TRADEMARK OFFICE
CERTIFICATE OF CORRECTION

PATENT NO. : 4,776,682

DATED : October 11, 1988

INVENTOR(S) : JUN HOSOYA

It is certified that error appears in the above-identified patent and that said Letters Patent is hereby corrected as shown below:

Column 2, line 8, "projections" should read --projection--.

Column 3, line 58, "and $\phi$ is the overall power" should be deleted.

Column 5, line 28, "sequency" should read -- sequence--;

line 37, "0.67 > $\phi_F/\phi 1.25$" should read --$0.67 > \phi_F/\phi > 1.25$--.

Column 6, line 18, "sequency" should read -- sequence--;

line 19, "first" should read --front--.

Signed and Sealed this

Twenty-fourth Day of January, 1989

Attest:

DONALD J. QUIGG

*Attesting Officer*      *Commissioner of Patents and Trademarks*